United States Patent
Luctman

(10) Patent No.: US 6,780,212 B1
(45) Date of Patent: Aug. 24, 2004

(54) SURFACE FINISHING COMPOSITION

(75) Inventor: Michael Scott Luctman, Knoxville, TN (US)

(73) Assignee: GS Technologies, Inc., Maryville, TN (US)

(*) Notice: Subject to any disclaimer, the term of this patent is extended or adjusted under 35 U.S.C. 154(b) by 0 days.

(21) Appl. No.: 10/393,138

(22) Filed: Mar. 20, 2003

(51) Int. Cl.[7] .............................. C09G 1/02; C09G 1/04; B24B 1/00
(52) U.S. Cl. .............................. 51/307; 51/308; 51/309; 51/306; 106/3; 106/10; 106/11; 134/2; 134/3; 134/7; 451/36
(58) Field of Search .......................... 51/307, 308, 309, 51/306; 106/3, 10, 11; 134/2, 4, 7, 3; 451/36

(56) References Cited

U.S. PATENT DOCUMENTS

| | | |
|---|---|---|
| 2,118,521 A | 5/1938 | Pickens |
| 3,518,099 A | 6/1970 | Holbus |
| RE27,890 E | 1/1974 | Holbus |
| 3,882,067 A | 5/1975 | Petrella |
| 3,956,174 A | 5/1976 | Palcher |
| 5,045,584 A | 9/1991 | Sasaki et al. |
| 5,433,890 A | 7/1995 | Meyer et al. |
| 6,193,791 B1 | 2/2001 | Vander Louw et al. |

*Primary Examiner*—Michael Marcheschi
(74) *Attorney, Agent, or Firm*—Pitts & Brittian, PC

(57) ABSTRACT

A finishing composition for a variety of surfaces, including, without limitation, paints, metals, plastics and fiberglass, comprises water, wax, soap, scent, hair conditioner, mineral spirits and abrasives.

5 Claims, 2 Drawing Sheets

SURFACE FINISHING COMPOSITION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to surface finishes for metallic, painted, plastic and fiberglass surfaces.

More particularly, this invention pertains to a water-based finishing composition adaptable to a wide variety of surface materials.

2. Description of the Related Art

There are many products available for surface finishing of metallic, plastic, fiberglass and painted surfaces. Most of the currently available products are petroleum solvent based and/or ammonia based. Petroleum solvent-based products, depending upon the concentration of solvent can be flammable or highly flammable. They are also dangerous if ingested or come in contact with eyes or lungs. Ammonia based products can also be flammable, depending upon the other ingredients in the composition, and have a disagreeable odor. Both the solvent and ammonia based products require substantial ventilation and can be irritating to the eyes, lungs and skin of the user or those nearby.

Metal finishing products, commonly known as metal polishes, are intended to polish metal surfaces to give them a shiny appearance.

Paint finishing products, commonly known as waxes, are intended for use on painted surfaces, such as vehicles, for example. There are many types of waxes on the market. They are generally applied as a thin coating on the surface and allowed to dry, usually turning hazy. Thereafter, a portion of the wax is removed by hand or machine buffing to leave a very thin layer of wax on the surface. This gives the painted surface a shiny finish that is smooth to the touch.

Although not as broadly used as metal and paint finishes, finishes have been developed for plastics, such as PLEXIGLASS™, LEXAN™, LUCITE™ and poly vinyl chloride, known as PVC. Frequently, surface finishing of these materials is performed in order to hide scratches on the surface and to provide a shiny appearance.

Fiberglass is a tough material that generally has a very smooth and shiny finish on the exterior surface. It is commonly used in the marine industry. Fiberglass finishing products are available and used primarily by boat owners, but have applications on in the automotive field as well. Due to the harsh environments to which boats are exposed, the smooth surfaces ARE adversely affected by both fresh and salt water, as well as marine life, such as algae. The outdoor elements also take a toll on exposed fiberglass boat surfaces. Regular finishing is often required to maintain the appearance of the fiberglass. Some people also believe that performance of boat hulls is improved through regular finishing.

BRIEF SUMMARY OF THE INVENTION

According to one embodiment of the present invention, a water-based finishing composition contains no ammonia and little or no organic solvents, depending upon the surface to be finished. The composition comprises, by volume, 30% to 75% water, 10% to 30% wax, 5% to 20% soap, 1% to 3% fragrance, 0% to 4% mineral spirits, 8% to 30% hair conditioner and 3% to 15% abrasives. These compositions are non-flammable, have a pleasant scent and are substantially safe for the user. The components are blended in different proportions for different surfaces. Differing blends of the same components offer excellent surface finishing properties for metal, painted, plastic and fiberglass surfaces.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
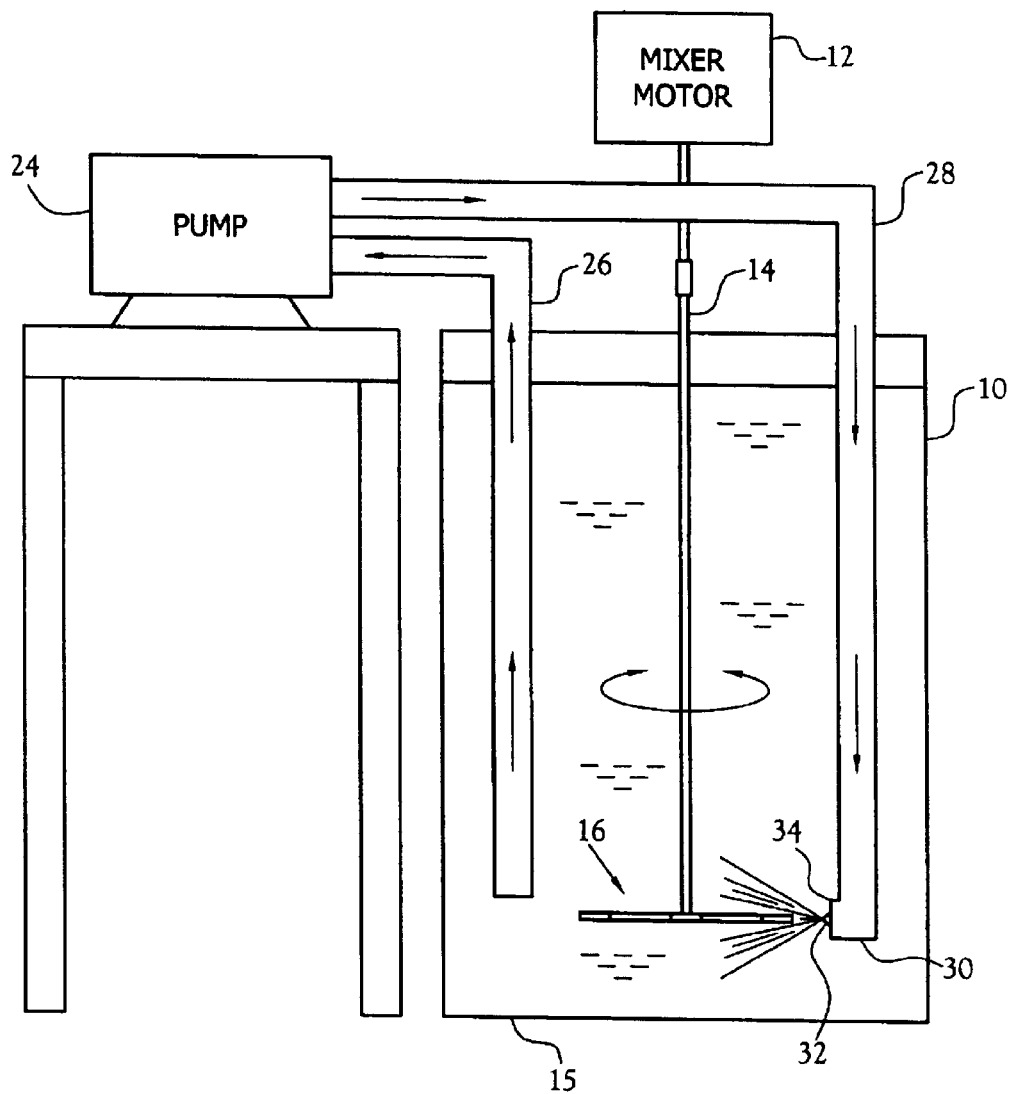
FIG. 1 is a perspective view of an elevation view of an apparatus for blending a composition in accordance with the present invention.
Figure 2:
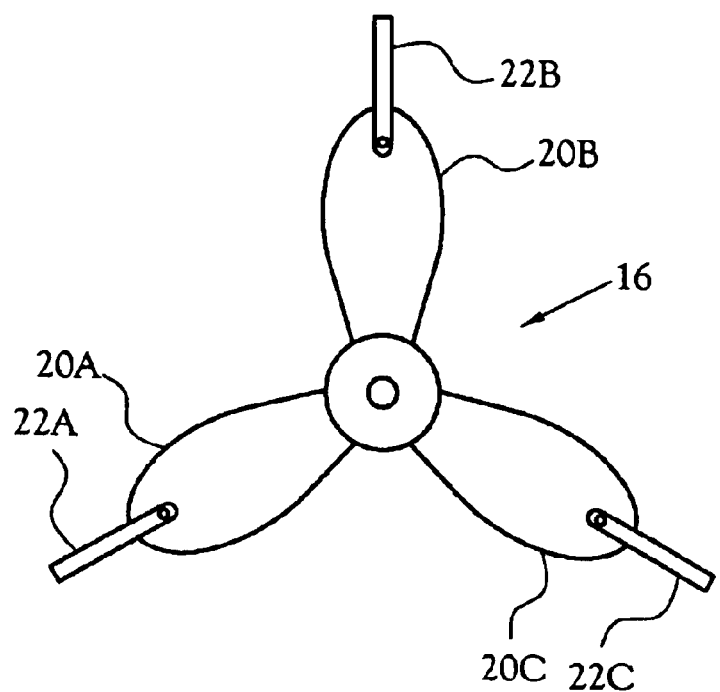
FIG. 2 is a plan view of a blending propeller for blending a composition in accordance with the present invention.

A water-based surface finishing composition for metal, paint, plastic and fiberglass surfaces is disclosed herein.

Water comprises 30% to 75% of the composition.

Wax comprises 10% to 30% of the composition. The wax may comprise any of several liquid waxes containing low levels of petroleum distillates including, but not limited to TURTLE WAX™ T123 liquid wax available from the Turtle Wax Company in Chicago, Ill.

Soap, preferably a vegetable oil soap containing vegetable oil and surfactants comprises 5% to 20% of the composition. One suitable soap is distributed under the name Johnsen's by Dolgencorp in Goodlettesville, Tenn.

Scent comprises 1% to 3% of the composition. Any of a variety of scents may be used. One suitable scent comprising a mixture of 50% apple cider scent and 50% French vanilla scent is available from Ameriplus in Oldsmar, Fla.

Some compositions, particularly those intended for painted surfaces and fiberglass surfaces, include mineral spirits in amounts ranging from 0% to 4%.

Cream form hair conditioners comprise 8% to 30% of the composition. Such hair conditioners may comprise water, cetyl alcohol, vitamin E extract, freesia extract, aloe vera gel, fragrance, potassium chloride, distearydimonium chloride, disodium EDTA, glycerine, propylene glycol, and colorings. One example of a suitable hair conditioner is Suave ™ Freesia Conditioner from Helene Curtis, Inc. of Wilmington Del.

Abrasive compounds comprise 3% to 15% of the composition. Suitable abrasives include chromium oxide, available from Pfizer Pigments from New York, N.Y., and Calcined Aluminas, available from Alcoa Products in Utica, N.Y. One particular blend of Calcined Aluminas comprised, by weight, 98.6% to 99.7% $Al_2O_3$, 0.01% to 0.12% $SiO_2$, 0.01% to 0.05% $Fe_2O_3$, 0.04% to 0.5% $Na_2O_3$, and 0.3% to 1.0% water. Preferred sizes for the abrasives range from 0.5 microns to 0.8 microns.

EXAMPLE 1

$H_2O$ 60%

Wax 10%

Vegetable oil soap 7.5%

Scent 2.5%

Hair Conditioner 10%

Abrasives 10%

The polishing of metal surfaces is generally achieved by using an abrasive blended in a lubricating media to smooth the metal surface. The smoother the metal surface, the greater its ability to reflect light and produce a better shine or mirroring surface. The composition of Example 1 provides excellent finishing results on aluminum, chrome, silver, gold, copper, brass and pewter. It provides a pleasant scent, is water soluble for easy cleanup, is non-irritating to the skin and is non-flammable. The combination of the vegetable oil soap and the hair conditioner gives excellent lubricating properties without using high levels of petroleum distillates. The abrasives allow for removal of a microscopic top layer of the metal surface, leaving a very smooth polished surface as the abrasive breaks down into ever smaller pieces. The wax leaves a protective film on the metal surface to aid in durability, sealing out water and other contaminants, such as dirt, dust and oils, for example.

EXAMPLE 2

$H_2O$ 40%

Wax 20%

Vegetable oil soap 11.25%

Scent 1.25%

Mineral spirits 2.5%

Hair Conditioner 20%

Abrasives 5%

Surface finishing of painted surfaces, such as vehicle, generally comprises washing the surface and then applying a wax product to the surface to give it a shiny appearance. In those cases where the paint has faded, as through oxidation, a rubbing compound with abrasives is used the remove the outer oxidized layer prior to waxing. In accordance with the present invention, a composition similar to Example 1 and identified as Example 2 is usable for painted surfaces.

Painted surfaces are generally not as hard or dense as metal surfaces. Accordingly, less abrasive is used in the composition of Example 2, yet there are still sufficient abrasives to remove an oxidized outer layer, as well as old wax remaining on the surface, without leaving scratches in the painted surface. In fact, it removes fine scratches from painted surfaces. Increasing the proportions of vegetable oil soap and hair conditioner provides additional lubrication for the painted surface to allow the lower amount of abrasives to polish the painted surface, without scratching. A greater proportion of wax allows for filling in the pores of the painted surface to make it smoother. A small amount of mineral spirits is included to aid in the removal of dirt, oil and wax buildup on the painted surface.

EXAMPLE 3

$H_2O$ 30%

Wax 30%

Vegetable oil soap 11.25%

Scent 1.25%

Mineral spirits 3.75%

Hair Conditioner 8.75%

Abrasives 15%

Finishing fiberglass surfaces is most commonly a concern for boat owners, though there are increasing numbers of vehicles and other equipment that includes fiberglass surfaces in need of finishing. Many of these vehicles are subjected to harsh conditions, such as boats in the water. These conditions can quickly deteriorate fiberglass surfaces. Typically, the maintenance of fiberglass surfaces, i.e. cleaning and finishing is a more difficult task than the maintenance of a painted surface. In order to compensate for this difference in difficulty, the composition of Example 3, intended for fiberglass surfaces, comprises a greater amount of abrasive and a greater amount of mineral spirits, to aid in removal of contaminants. A greater amount of wax is included to give more protection for the surface from extreme environmental conditions.

EXAMPLE 4

$H_2O$ 41%

Wax 15%

Vegetable oil soap 15%

Scent 1%

Hair Conditioner 25%

Abrasives 3%

Plastic surface finishing generally requires a less aggressive composition, as compared to metal, painted or fiberglass surfaces. When finishing plastics, such as PLEXIGLASS™, LEXAN™, LUCITE™ and poly vinyl chloride, known as PVC, people often uses products already on hand for metal or painted surface finishing. However, these products are generally too aggressive for plastic surfaces and may leave undesirable scratches. The composition of Example 4 reduces the amount of abrasives so that it is not too aggressive for the plastic surface. The amounts of soap and conditioner are increased to a total level of 40% of the composition to add additional lubrication to prevent scratching and leave a smooth surface. No mineral spirits are included to prevent clouding or other damage to the plastic surface.

Referring to the drawings, to blend a composition in accordance with the present invention, a combination of materials, such as those described in Examples 1–4, is placed in a mixing tank 10, such as a 55 gallon barrel, for example. A mixing motor 12 capable of rotating a shaft 14 at up to 1150 rpm is mounted upon the mixing tank 10 with the rotatable shaft 14 extending down into the barrel to a position approximately 2 inches from the bottom 15 of the mixing tank 10. A propeller 16 is secured to the distal end 18 of the shaft 14, whereby rotation of the shaft 14 effects rotation of the propeller 16 as well. The propeller 16 in the pictured apparatus includes three blades 20A, 20B and 20C, each of which carries an extension blade 22A, 22B and 22C, respectively, at the outboard end thereof. Each of the extension blades 22A, 22B and 22C comprises a steel blade that is three inches long, ¼ inch wide and ¹⁄₁₆ inch thick. The extension blades may be secured with screws, bolts or rivets, for example. The extension blades provide an increased diameter for the propeller 16, without the resistance provided by larger propeller blades 20A, 20B and 20C. The small thickness of the extension blades also operate like a knife, repeatedly cutting through the blending composition. The motor 12 is attached to the mixing tank 10 at an attitude that orients the propeller at an angle that is not parallel to the bottom 15 of the mixing tank 10, so that the propeller 16 is located generally in the center of the mixing tank 10. In the alternative, the motor 12 may be mounted on a frame (not shown) above the mixing tank 10 so that the shaft extends along a central axis of the mixing tank 10.

A pump 24 is located adjacent to the mixing tank 10 to provide circulation of the composition during blending. An intake conduit 26 extends from the pump 24 into the mixing tank 10, preferably to a height of about 5 inches above the bottom 15 of the mixing tank 10. The intake conduit 26 provides flow communication between the mixing tank 10 and the pump 24. A discharge conduit 28 extends from the pump 24 into the mixing tank 10, preferably to a height of about 2 inches above the bottom 15 of the mixing tank 10, i.e. about the same height as the propeller 16. Both the intake conduit 26 and the discharge conduit 28 are ¾ inch pipe in the depicted embodiment. The distal end section 30 of the discharge conduit 28 is angled toward the propeller 16. A ¼ inch stainless steel spray tip 32 is located in the distal end 34 of the discharge conduit 28 to spray the composition urged by the pump 24 through the discharge conduit 28 in a v-shaped pattern toward the propeller 16.

In operation, as the mixing motor 12 rotates the propeller 16, the composition is drawn from the mixing tank 10 through the intake conduit 26 by the pump 24 and then directed through the discharge conduit 28. The composition is sprayed into the moving blades 20A, 20B and 20C and the extension blades 22A, 22B and 22C of the propeller. In this manner, a very uniform blend of the composition is provided. In addition, the abrasives are broken into even finer particles. Finer particles provide improved surface finishing.

In use, the composition is applied to a solid surface, such as paint, metal, fiberglass or plastic, for example. The composition is then rubbed over the solid surface, as with a mitt, rag or pad, for example. Thereafter, the majority of the composition is removed, leaving a remaining portion of the composition on the solid surface. The remaining portion is allowed to dry by evaporation, preferably under ambient conditions.

It will be recognized that the water base of the present invention will permit larger particles of abrasives to settle if the propeller 16 ceases rotation. Accordingly, it is preferred that product is removed for packaging while the propeller 16 is rotating.

Those skilled in the art will recognize that various types of soaps, waxes, scents, conditioners and abrasives may be used without departing from the spirit and scope of the present invention.

From the foregoing description, it will be recognized by those skilled in the art that an improved surface finishing composition has been provided.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

I claim:

1. A surface finishing composition comprising:
   (a) between about 30 and about 70 volume percent water;
   (b) between about 10 and about 30 volume percent wax;
   (c) between about 5 and about 20 volume percent soap;
   (d) between about 8 and about 30 volume percent hair conditioner;
   (e) between about 3 and about 15 volume percent abrasives; and
   wherein said volume percents are based upon the total volume of the composition.

2. The composition of claim 1 further comprising between 0 and about 4 volume percent mineral spirits.

3. The composition of claim 1 further comprising between about 1 and about 3 volume percent scent solution.

4. The composition of claim 1 wherein said soap comprises a vegetable oil soap.

5. A process for finishing a solid surface selected from the group comprising paint, metal, fiberglass and plastic, comprising applying a composition in accordance with claim 1 to said solid surface, rubbing said composition over said solid surface, removing the majority of said composition from said solid surface to leave a remaining portion of said composition on said solid surface and allowing said remaining portion to dry under ambient conditions.

* * * * *